US006594541B1

United States Patent
Wucherer et al.

(10) Patent No.: US 6,594,541 B1
(45) Date of Patent: Jul. 15, 2003

(54) UNIVERSAL MOTION CONTROL (75) Inventors: Klaus Wucherer, Winkelhaid (DE); Armin Amrhein, Kuemmersbruck (DE); Karl Hess, Lichtenau (DE); Tino Heber, Freiberg (DE); Steffen Kirste, Amtsberg-Dittersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 250 days.

(21) Appl. No.: 09/591,420

(22) Filed: Jun. 10, 2000

(51) Int. Cl.[7] .............................................. G06F 19/00
(52) U.S. Cl. ........................ 700/159; 700/18; 700/13; 700/3; 700/28; 700/169
(58) Field of Search ................ 700/18, 3, 28, 700/169, 159; 703/13

(56) References Cited

U.S. PATENT DOCUMENTS

| | | | | |
|---|---|---|---|---|
| 4,135,239 A | * | 1/1979 | Hamill et al. ................ 700/180 |
| 4,684,862 A | * | 8/1987 | Rohrle ..................... 318/568.2 |
| 4,947,336 A | * | 8/1990 | Froyd ........................ 700/188 |
| 5,025,385 A | * | 6/1991 | Froyd ........................ 700/169 |
| 5,291,391 A | * | 3/1994 | Mead et al. .................. 700/28 |
| 5,659,480 A | * | 8/1997 | Anderson et al. ........... 700/186 |
| 5,850,338 A | * | 12/1998 | Fujishima ...................... 700/3 |
| 5,877,959 A | * | 3/1999 | Kamiyama et al. ..... 364/474.01 |
| 5,930,141 A | * | 7/1999 | Kamiyama et al. ......... 700/159 |
| 5,933,638 A | * | 8/1999 | Cencik ........................ 717/131 |
| 6,198,246 B1 | * | 3/2001 | Yutkowitz .................. 318/561 |
| 6,438,444 B1 | * | 8/2002 | Mizuno et al. ............. 700/169 |
| 6,483,444 B2 | * | 8/2002 | Mizuno et al. ............. 700/169 |
| 6,470,225 B1 | * | 10/2002 | Yutkowitz .................... 700/44 |

FOREIGN PATENT DOCUMENTS

DE          19740550 A1     4/1998

* cited by examiner

*Primary Examiner*—John Follansbee
*Assistant Examiner*—Thomas Pham
(74) *Attorney, Agent, or Firm*—White & Case LLP (57) ABSTRACT

The integration of a programmable logic controller (PLC) and a motion control (NC) into a universal motion control (UMC) is realized by a tailored and nonetheless essentially user-configurable run-level model for processing of software tasks. This run-level model consists of types of different user levels and system levels with different priorities. In particular, one of the run levels (FA) can be configured very effectively according to user requirements. Thus, this kind of universal motion control (UMC) can be optimized by software to the particular requirements of the control task and the technical process.

15 Claims, 5 Drawing Sheets

UNIVERSAL MOTION CONTROL

FIELD OF INVENTION

The invention pertains to a universal motion control which functionally combines the classical tasks of a programmable logic controller and a numerical controller.

BACKGROUND OF INVENTION

It is common today to model different hierarchical run levels both for programmable logic control and also for motion control, wherein the software tasks of the run levels are allocated to control a corresponding technical process. These tasks can comply with system tasks, but they can also be user-programmed.

From DE 197 40 550 A1 it is known that process control functionalities of the programmable logic controllers "PLC" and motion functionalities of NC controller can be integrated into a standardized and configurable control system.

The PLC/NC integration takes place in the form of the interconnection of PLC and NC-control assemblies. But, in this design of the integration, an optimum and efficient task structure cannot be obtained for all of the control tasks.

SUMMARY OF INVENTION

Therefore, the invention is based on the problem of creating optimum instances of the combined PLC/NC control in a simple manner for different control tasks and different initial conditions or requirements of the underlying technical process.

These optimum instances, in principle, are achieved by a consistently configurable run-level model for the control tasks of the combined PLC/NC control. Based on this background, the above-stated problem is solved in that a consistent run level model is formed that has several run levels of various types with different priorities, wherein the following run levels are provided, from greatest to lowest priority:

- a) a position-control level, comprising associated clocked system level and user level,
- b) an interpolator level, comprising associated clocked system level and user level,
- c) an event system level for events requiring a response,
- d) a user level for asynchronous errors,
- e) an additional user-configurable user level according to user requirements, for alarm and/or event and/or control and/or other periodic tasks,
- f) a level group for background processing, formed from a sequence of motion sequences, free cycles and other low-priority system tasks, wherein the run levels a to e form a level group for real-time processing.

One important advantage of this layering resides in the fact that the communication between the tasks of the process control and those of the motion control is minimized. An additional advantage is that the programming of the control tasks for the process control and for the motion control can be done in a standardized programming language with standardized front-end development tools.

A first embodiment of the present invention is characterized in that the free programmable tasks can each be triggered by signals from the clocked system levels and/or by signals from the event system level. This will assure that the control can respond immediately to an external event, for example.

In an additional favorable preferred embodiment of the invention, additional prioritizing layers are provided within the run levels. The software structure of the combined PLC/NC motion control can be optimized for the different control tasks or for the requirements of the underlying technical process. For example, it is possible to allocate different sources of error to different levels with ascending priority within the user level for asynchronous errors.

In this case it is possible that the priority layers are user-programmable in the user level for asynchronous errors. Thus, the control can be adapted very flexibly by the user for the range of events underlying the application.

In an additional preferred embodiment of the invention, even externally loadable programs can be integrated into the "level group for real-time processing." Due to this reloading, the desired output control can be dynamically expanded by additional technological functionality.

In an additional preferred embodiment of the invention, the motion sequences, free cycles and other low-priority system tasks can be handled by means of a Round-Robin method in the level group for background processing.

This will ensure that all tasks at this level are handled within a time span defined by the user, and no task at this level will have to wait in vain to be processed.

The essential advantages attainable with the invention include the fact that, due to the potential for parameterization of the run levels by the user, an optimum configuration of the control can be attained for the particular situation. This is because every control problem and every technical process has different requirements in the software implementation within the control system (e.g., quantity of required programs, modules, tasks, number of possible error situations, number of external events that require an appropriate response, complexity of the synchronization). In addition, due to the integration of the process control and the motion control, the communication expense within the control will be drastically reduced.

BRIEF DESCRIPTION OF DRAWINGS

One design example of the invention is presented in the figures and will be explained in greater detail below.

Shown are:

FIG. 1, a known control of a technical process with separate programmable logic controller and motion controller. Programming takes place by means of separate programming systems, FIG. 2, the essential run-levels of a programmable logic controller, FIG. 3, the essential run-levels of a motion control, FIG. 4, the universal control according to this invention, FIG. 5, the run-level model of this universal control, FIG. 6, the polling of tasks from the two clocked system levels and from the "event system level" of the run-level model of the universal control, FIG. 7, a design example for the user-configurable user level, according to the user's specific requirements, for alarm and/or event and/or control and/or other periodic tasks, and FIG. 8, a design example like that in the level group for background processing, for processing of a set of motion sequences, free cycles and other low-priority system tasks using a Round-Robin method.

DETAILED DESCRIPTION

Figure 1:
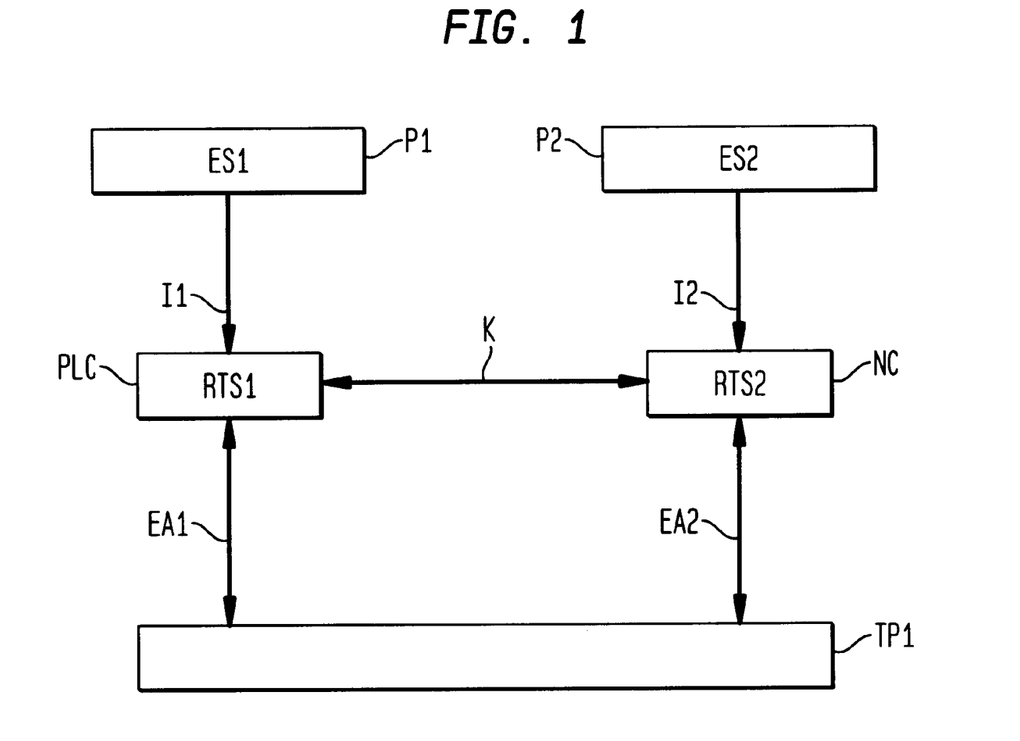

In the illustration according to FIG. 1 a block diagram is used to show that control of a technical process TP1, involves parallel operation of a programmable logic controller PLC and a motion control NC. Programmable logic controller PLC and motion controller NC each contain a Run-Time system RTS1 or RTS2. The communication between the two controllers takes place by means of special auxiliaries; in this example, a bidirectional communications channel K is shown. The programming of the controls by the user takes place, as a rule, in different programming languages with different front-end development tools. This means that separate programming or engineering systems P1, ES1 and P2, ES2 are used. The essential disadvantage of this conventional design rests, first, in the complicated communication between the two controllers, and second, in the separate and different programming or engineering systems P1, ES1 and P2, ES2. The actual technical process TP1 is controlled by means of the inputs and outputs EA1, EA2 of the control. Between the programming system P1 and the programmable logic controller PLC, or between the programming system P2 and the numerical control NC, there are information paths I1 or I2, along which the programs are loaded into the particular control.

Figure 2:
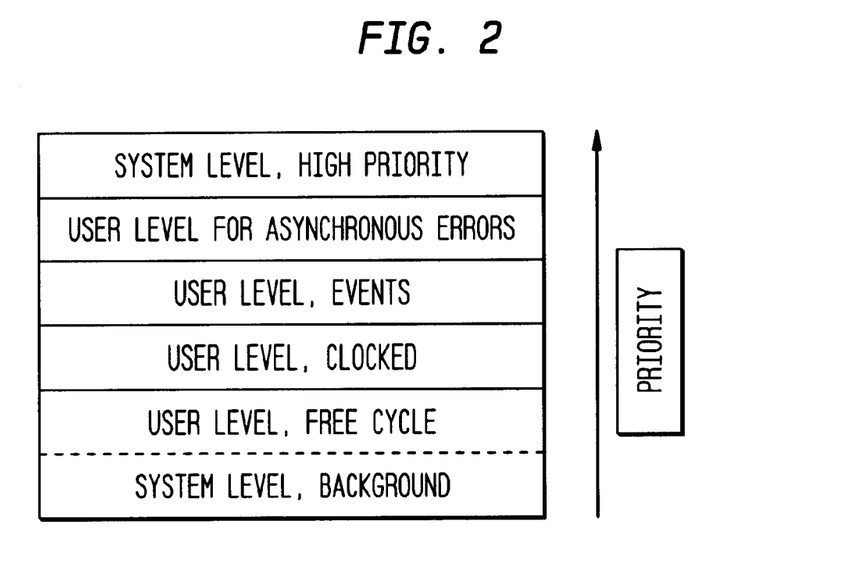

In the illustration according to FIG. 2, the essential run levels of a classical programmable logic controller (PLC; FIG. 1) are shown, sorted according to priority. In this case, the increase in priority is indicated by an arrow. In the lowest-priority level, as indicated by a dashed line, two different tasks are to be handled, namely, a free cycle, i.e., "user level, free cycle" and a background system level, i.e., "system level, background," in a Round-Robin method, that is, by time-slot control. The background system levels are allocated to communications tasks, for example. In a clocked user level, labeled "user level, clocked" and described below, the polling clock of the task or of the program is parameterized at this level. Then comes a monitor to check whether the processing of a user program at this clocked level has been concluded in a timely manner, before the start event is reset. If the clock time expires without the user program having finished processing of the allocated level, then a corresponding task will be started according to the priority of the next "user level for asynchronous errors." In this "user level for asynchronous errors" the user can program the handling of the error states.

After the "user level, clocked" there follows a "user level, events." The response to external or internal events takes place within the "user level, events." A typical example for this kind of event is the exceeding of a limit value. In a "system level, high priority" there are tasks of the operating system which secure the operating mode of the programmable logic controller.

Figure 3:
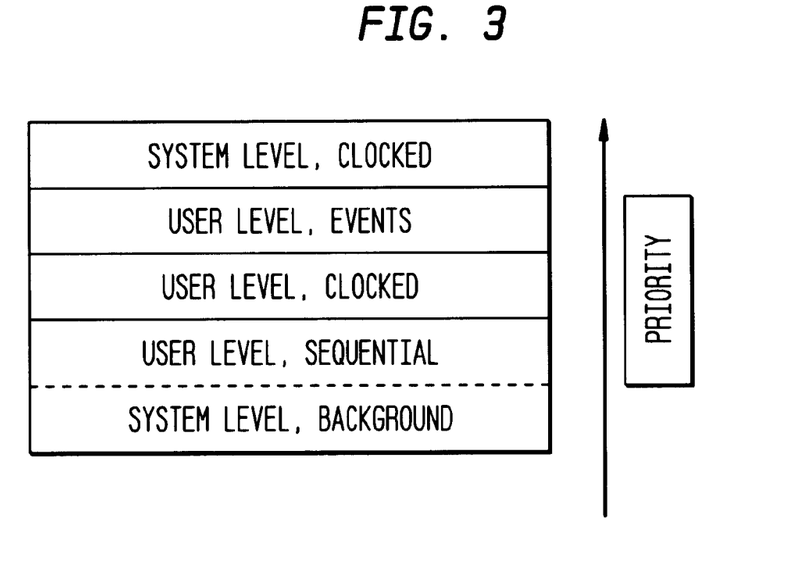

The illustration according to FIG. 3 shows the essential run levels of a motion controller (NC; FIG. 1). Here, too, the individual levels are arranged according to their priority, as indicated by an arrow. A "system level, background" and a "user level, sequential" have the same priority, namely the lowest. This task-oriented relationship is indicated by a dashed line as in FIG. 2. The tasks of "user level, sequential" are processed together with the tasks of the "system level, background" in a Round-Robin method. For example, some typical tasks of the "system level, background" are those required for communication. The program units programmed by the user for the actual control task run the "user level, sequential." If the control in one of these program units conflicts with a motion or positioning command, then a Suspend command is generated, i.e., the application program will be interrupted at this point. Processing of this motion or positioning command is done in a top-priority "system level, clocked." Every position controller running in the "system level, clocked," executes this motion or positioning command. After execution of the command, the program will return to the "user level, sequential" and the application program interrupted by the Suspend command will continue at the same location by means of a Resume command. The "system level, clocked" contains the already-mentioned position controllers and also the interpolation part of the control.

At the lowest priority level there is a "user level, clocked." This is where periodic tasks run, e.g. controller functionalities.

Tasks that respond to external or internal events are located in a following "user level, events." These events can be Alarms, for example.

Figure 4:
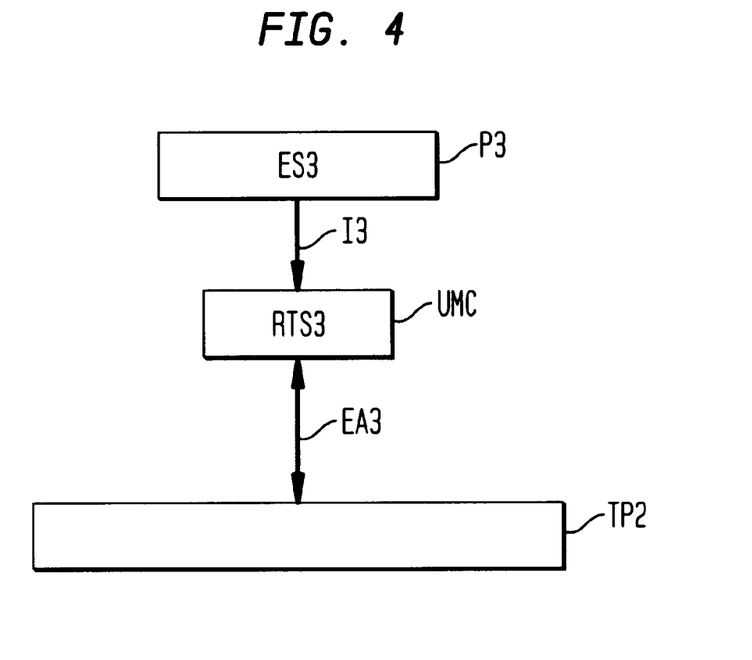

In the representation according to FIG. 4, a technical process TP2 is controlled by a combined PLC/NC controller UMC. The acronym UMC stands for UNIVERSAL-MOTION-CONTROL. The link between the controller UMC and the associated technical process TP2 occurs bidirectionally along inputs/outputs EA3. Programming of the combined PLC/NC-control takes place by means of a common programming P3 or engineering system ES3, and the engineering system ES3 has a user-friendly interface, like that in FIG. 1, for the programming system P3. The programs prepared with it are passed over an information path I3 into a run-time system RTS3 of the universal motion controller UMC.

Figure 5:
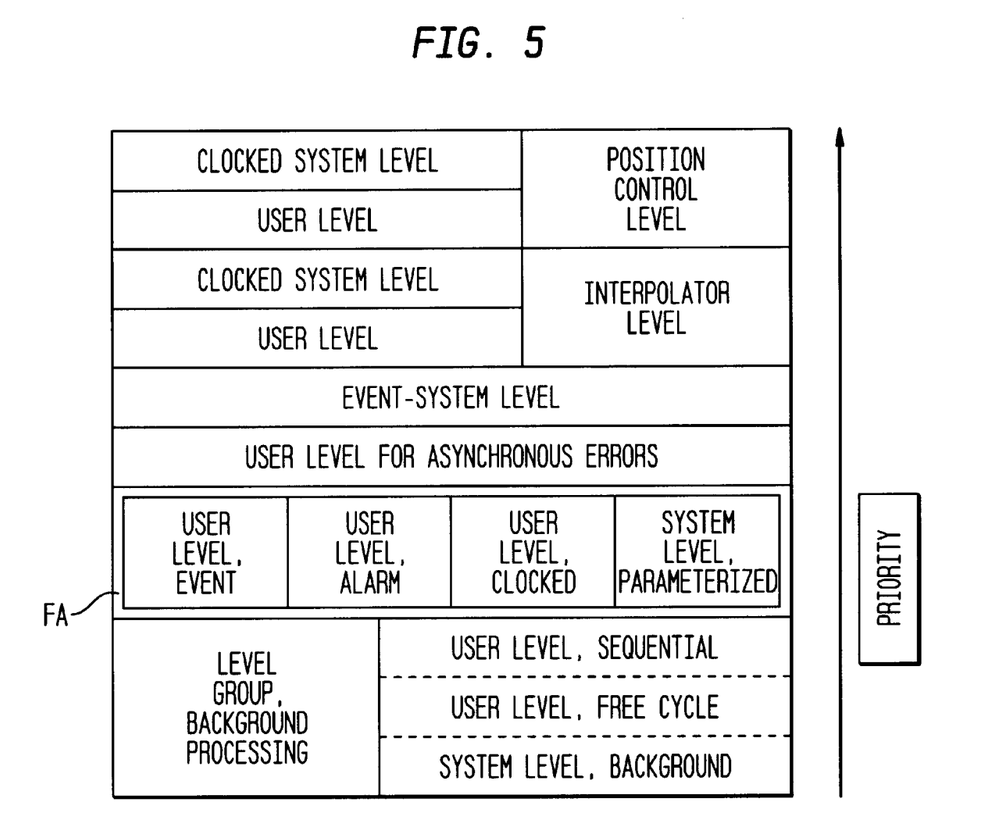

The illustration according to FIG. 5 shows the run-level model of the universal motion controller. Prioritizing of the levels is indicated by an arrow, which points in the direction of highest priority, as before. The lowest-priority level group is the so-called "level group, background processing." It consists of a "system level, background," a "user level, free cycle" and a "user level, sequential." The tasks of these three same-priority levels (indicated by the dashed boundary lines) are processed cyclically in a Round-Robin method. (Details of this are presented below in conjunction with FIG. 8.) The higher-order "run level" following the "level group, background processing" is a user-configurable user-level FA according to the user's requirements; it is identified by a double border and is used for alarm and/or event and/or control and/or other periodic tasks. This user-level FA thus explicitly consists of four types of levels, which, in turn, can be sorted by the user with regard to priorities within the user-level FA, which will be discussed in greater detail in conjunction with FIG. 7.

Type 1: User level, event
Type 2: User level, alarm
Type 3: User level, clocked
Type 4: System level, parameterized Levels of these types can be placed by the user within the user-level FA by means of user-defined priorities. For example, the user will be able to achieve an optimum execution of the universal motion controller according to the requirements and boundary conditions of the control task and of the technical process to be controlled.

For instance, tasks can be placed in the "user level, event" to respond to inputs from peripherals. In the "user level, alarm" there are tasks, e.g., that respond to values exceeding the set limit. The "user level, clocked" contains periodic, user-programmable tasks. Externally loadable programs can be integrated into the "system level, parameterized." Thus it is possible for the universal motion controller to be expanded dynamically by additional technical functionalities. The "system level, parameterized" usually loads tasks for slow control or monitoring problems (e.g., problems with cycle times in the range of 100 ms).

The level with the next higher priority in the run-level model of the universal motion control is a "user level for asynchronous errors." At this level the user can program the handling of error states, similar to a programmable logic controller. The "user level for asynchronous errors" contains tasks that respond to equipment alarms, for example. Thus, the user has the opportunity in this "user level for asynchronous errors" to supply parameters for the specific number of levels needed for the particular product. For simplicity, details of this process are not provided in the explanation. Thus the user can assign a particular priority to certain error events as necessary.

Next comes the "event system level." Tasks at the "event system level" respond to critical internal or external events, such as, e.g., an Emergency Stop command.

The next level is an "interpolator level." It includes a "clocked system level" and a "user level."

The highest-priority level is the "position control level." It, too, contains a "clocked system level" and a "user level." The user levels at the position control level and interpolator level contain tasks that are polled by the position control clock and the interpolator clock, respectively. The runtime of these tasks is monitored; if a time specified by the system is exceeded, then this will cause an interrupt of the level and the triggering of an asynchronous error in the "user level for asynchronous errors."

The position controller has a higher priority than the interpolator, i.e., the position controller cannot be interrupted by the interpolator, but the position controller can interrupt the interpolator.

In the run-level model of the universal motion control, additional prioritized layers can be provided, in principle, within the individual run levels in addition to those already mentioned.

Figure 6:
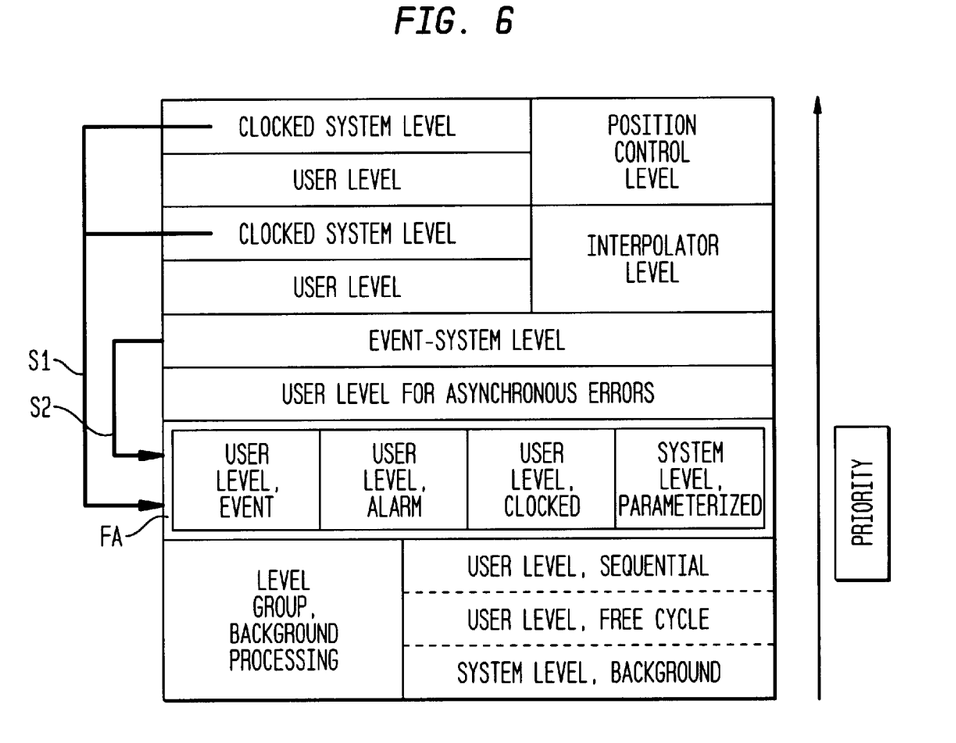

The illustration according to FIG. 6 shows how signals S1 generated in the "system level, clocked" (position controller and interpolator) or signals S2 generated in the "event system level" have conflicted with tasks in the user-configurable user level FA set up by the user for alarm and/or event and/or control and/or other periodic tasks.

Figure 7:
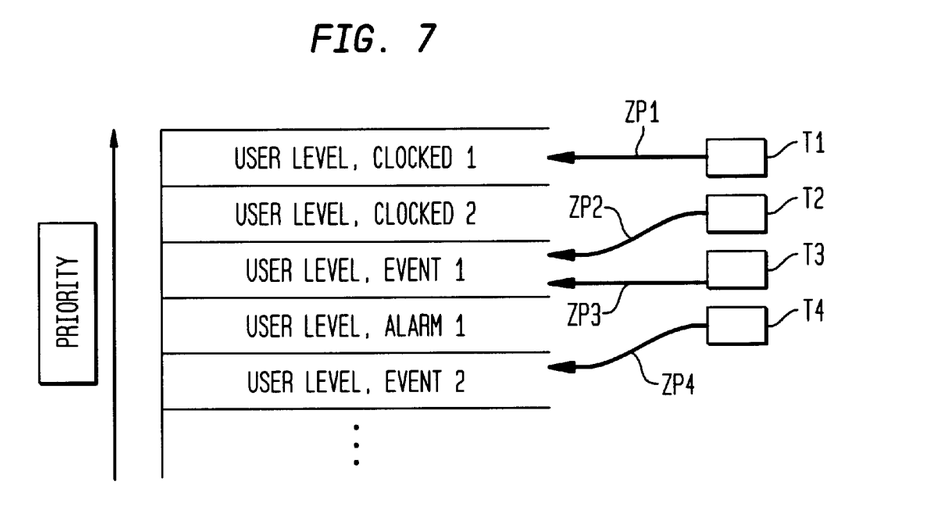

The illustration according to FIG. 7 shows an example of a user-configurable user level (FA; FIGS. 5 and 6) set up according to the user's requirements for alarm and/or event and/or control and/or other periodic tasks. The tasks T1, T2, T3 and T4 are allocated to the levels. The allocation is represented by allocation arrows ZP1 to ZP4. The prioritizing of the levels is indicated, as before, by an arrow that points in the direction of the highest priority.

Figure 8:
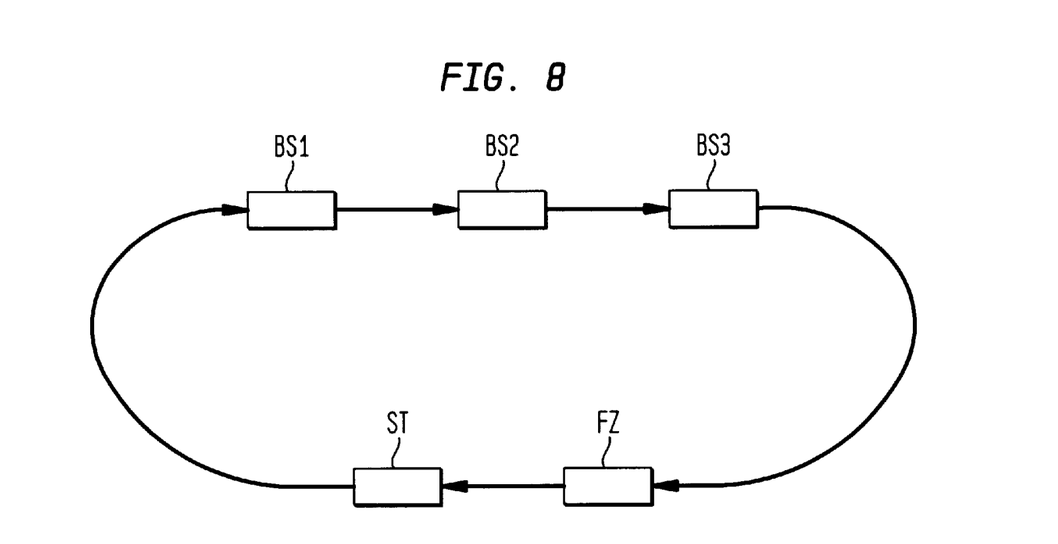

The illustration according to FIG. 8 shows the processing of tasks at the "level group, background processing" (FIGS. 5 and 6). In this regard, motion sequences BS1, BS2 and BS3 and also a free cycle FZ (as is common in programmable logic controllers (PLC)) and a system task ST at the "system level, background" are being processed in a Round-Robin method. In a method of this type, tasks are handled according to a consistent time slot method. If their time slot has expired or if there is an interrupt, then the task transfers control, i.e., the next task will be processed. By selection of the time slot it is possible to adapt the control to the particular requirements. The Round-Robin method thus ensures that all tasks at the process level are handled. Thus it is impossible for individual tasks to tie up the computing power so that other tasks will not be served.

What is claimed is:

1. A motion controller that performs programmable logic control tasks and numerical control tasks, the controller comprising a consistent run-level model that has a plurality of run levels having respective priorities, the run levels comprising:

a) a position-control level, comprising associated clocked system level and a first user level, b) an interpolator level, comprising associated clocked system level and a second user level, c) an event system level for events requiring a response, d) a third user level for asynchronous errors, e) a fourth user level configurable according to user requirements programmable tasks, f) a level group for background processing, comprising a set of motion sequences and free cycles, wherein the run levels a to e correspond to a level group for real-time processing.

2. The motion controller according to claim 1, wherein the programmable tasks can each be triggered by signals from the group consisting of signals from the clocked system levels and signals from the event system level.

3. The motion controller according to claim 1, wherein prioritizing layers are provided within at least one of the run levels.

4. The motion controller according to claim 1, further comprising externally loadable programs integrated into the level group for real-time processing.

5. The motion controller according to claim 1, wherein the motion sequences and free cycles are processed according to a Round-Robin method in the level group for background processing.

6. The motion controller according to claim 3, wherein the priority layers are user-programmable in the user level for asynchronous errors.

7. A motion controller that performs programmable logic controller and numerical controller tasks, comprising a consistent run-level model having a plurality of run levels, each run level having a respective priority, the run levels comprising:

a. a position-control level, comprising a first associated clocked system level and a first user level;

b. an interpolator level, comprising a second associated clocked system level and a second user level;

c. an event system level for events requiring a response;

d. a third user level for asynchronous errors;

e. a fourth user level configurable by a user according to user requirements; and f. a level group for background processing, the level group comprising a plurality of motion sequences, free cycles and low-priority system tasks; wherein run levels a to e form a level group for real-time processing.

8. The motion controller according to claim 7, wherein run levels a–e are in order of diminishing priority, run level a being greatest priority and run level e being lowest priority.

9. The motion controller according to claim 7, wherein the fourth user level is operatively associated with at least one task selected from the group consisting of: alarm, event, control and periodic tasks.

10. The motion controller according to claim 7, wherein a plurality of priority layers is provided within at least one of the run levels.

11. The motion controller according to claim 7, further comprising an externally loadable program integrated into the level group for real-time processing.

12. The motion controller according to claim 7, wherein the motion sequences, free cycles and other low-priority systems tasks are handled according to a Round-Robin method in the level group for background processing.

13. The motion controller according to claim 9, wherein the at least one task can be triggered by a signal from a clocked system level of the motion controller.

14. The motion controller according to claim 9, wherein the at least one task can be triggered by a signal from an event system level of the motion controller.

15. The motion controller according to claim 10, wherein the priority layers are user-programmable in a user level for asynchronous errors.

\* \* \* \* \*

UNITED STATES PATENT AND TRADEMARK OFFICE
CERTIFICATE OF CORRECTION

PATENT NO. : 6,594,541 B1
DATED : July 15, 2003
INVENTOR(S) : Wucherer et al.

It is certified that error appears in the above-identified patent and that said Letters Patent is hereby corrected as shown below:

Title Page,
Add Item:

-- [30]     Foreign Application Priority Data
This application claims priority under 35 U.S.C. §119 to PCT/DE00/00059, filed Jan. 10, 2000. --

Column 6,
Line 10 and 12, add -- an -- after "comprising".
Line 18, add -- for -- after "requirements".

Signed and Sealed this

Fifteenth Day of June, 2004

JON W. DUDAS
*Acting Director of the United States Patent and Trademark Office*